United States Patent
Seletskiy et al.

(10) Patent No.: US 11,599,637 B1
(45) Date of Patent: Mar. 7, 2023

(54) SYSTEMS AND METHODS FOR BLOCKING MALICIOUS SCRIPT EXECUTION

(71) Applicant: Cloud Linux Software Inc., Estero, FL (US)

(72) Inventors: Igor Seletskiy, Palo Alto, CA (US); Aleksei Berezhok, Moscow (RU); Evgenii Vodilov, Moscow (RU)

(73) Assignee: CLOUD LINUX SOFTWARE, INC., Estero, FL (US)

( * ) Notice: Subject to any disclaimer, the term of this patent is extended or adjusted under 35 U.S.C. 154(b) by 54 days.

(21) Appl. No.: 17/389,523

(22) Filed: Jul. 30, 2021

(51) Int. Cl.
*G06F 21/56* (2013.01)

(52) U.S. Cl.
CPC .......... *G06F 21/564* (2013.01); *G06F 21/568* (2013.01); *G06F 2221/034* (2013.01)

(58) Field of Classification Search
CPC .... G06F 21/566; G06F 21/568; G06F 21/563; G06F 21/564; G06F 21/56; G06F 21/562; G06F 21/561; G06F 16/2358; G06F 2221/034
See application file for complete search history.

(56) References Cited

U.S. PATENT DOCUMENTS

| | | | | |
|---|---|---|---|---|
| 7,624,443 | B2 * | 11/2009 | Kramer | G06F 21/554 709/224 |
| 8,201,244 | B2 * | 6/2012 | Sun | G06F 21/566 713/193 |
| 9,813,443 | B1 * | 11/2017 | Subramanian | G06F 21/561 |
| 2007/0271301 | A1 * | 11/2007 | Klive | G06F 16/29 |
| 2008/0127336 | A1 * | 5/2008 | Sun | G06F 21/566 726/22 |
| 2009/0044024 | A1 * | 2/2009 | Oberheide | H04L 63/145 713/188 |
| 2009/0089879 | A1 * | 4/2009 | Wang | G06F 21/53 726/24 |
| 2011/0083176 | A1 * | 4/2011 | Martynenko | G06F 21/55 726/13 |
| 2017/0041338 | A1 * | 2/2017 | Martini | H04L 63/1416 |
| 2017/0329968 | A1 * | 11/2017 | Wachdorf | G06F 21/566 |

\* cited by examiner

*Primary Examiner* — Michael Simitoski
(74) *Attorney, Agent, or Firm* — ArentFox Schiff LLP; Michael Fainberg

(57) ABSTRACT

Disclosed herein are systems and method for blocking malicious script execution. In one exemplary aspect, the method may comprise detecting an execution of a script that creates or modifies a file on a computing device and recording a first report comprising a list of operations involved in the execution of the script, an identifier of the script, and an identifier of the file. The method may comprise determining that the file includes malicious code using a malware scanner and recording a second report comprising an indication that the file includes malicious code and an identifier of the file. In response to determining that identifier of the file is present in both the first report and the second report, the method may comprise generating and storing a first rule that prevents complete execution of any script that shares at least one operation in the list of operations with the script.

20 Claims, 5 Drawing Sheets

SYSTEMS AND METHODS FOR BLOCKING MALICIOUS SCRIPT EXECUTION

FIELD OF TECHNOLOGY

The present disclosure relates to the field of data security, and, more specifically, to systems and methods for blocking malicious script execution.

BACKGROUND

Anti-virus and malware scanners often detect malicious activity once it has already occurred. At this point, the damage caused by the malicious entity has happened and may be irreversible. In some cases, a script that seems benign may be executed, thus generating a malicious file, and the scanner will be unable to prevent the execution (because the script does not appear malicious). The malicious file may then proceed to harm the computing device.

Because conventional data security systems are reactive and do not prevent malicious executions, computing devices are still at risk of harm. There thus exists a need for the proactive blocking of malicious script executions.

SUMMARY

Aspects of the disclosure relate to the field of data security. In particular, aspects of the disclosure describe methods and systems for blocking malicious script execution.

In one exemplary aspect, the method may comprise detecting an execution of a first script that creates or modifies a file on a computing device. The method may comprise recording, in a database, a first report comprising a first list of operations involved in the execution of the first script, an identifier of the first script, and an identifier of the file. The method may comprise determining that the file includes malicious code using a malware scanner configured to scan for malware signatures on the computing device. The method may comprise recording, in the database, a second report comprising an indication that the file includes malicious code and an identifier of the file. The method may comprise in response to determining that identifier of the file is present in both the first report and the second report, generating a first rule that prevents execution of any script that shares at least one operation in the first list of operations with the first script. The method may comprise blocking, based on the first rule, complete execution of scripts that involve at least one operation in the first list of operations on the computing device.

In some aspects, blocking the complete execution of scripts may comprise detecting an execution of a second script on the computing device and determining a second list of operations involved in the execution of the second script. The method may comprise applying the first rule on the second list of operations by comparing the first list of operations with the second list of operations, determining, based on the comparing, that the first list of operations corresponds to the second list of operations, and blocking the execution of the second script from completion.

In some aspects, the method may comprise prior to the execution of the first script, determining whether a rule exists in a rules database indicating that the first script should be blocked, and enabling execution of the first script in response to determining that the rule does not exist in the rules database.

In some aspects, the first report includes timestamps of operations and the second report includes a timestamp of when the file was created or modified. The method may further comprise determining a time period associated with the timestamps of the list of operations, and determining that the first report should be compared to the second report in response to determining that the timestamp of when the file was created or modified occurs within the time period.

In some aspects, the first rule further comprises a modified version of the list of operations to block.

In some aspects, the method may comprise determining the modified version of the list of operations by converting each operation identifier in the list of operations to a regular expression.

In some aspects, the method comprises converting the first rule from a text format to a binary format and storing the converted first rule in the rules database.

In some aspects, the execution of the first script creates or modifies a plurality of files including the file and another file, wherein the another file is identified as including malicious code by the malware scanner. Generating the first rule is thus further in response to detecting either an identifier of the another file or the identifier of the file in both the first report and the second report.

In some aspects, the first script is a PHP script.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for blocking malicious script execution. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
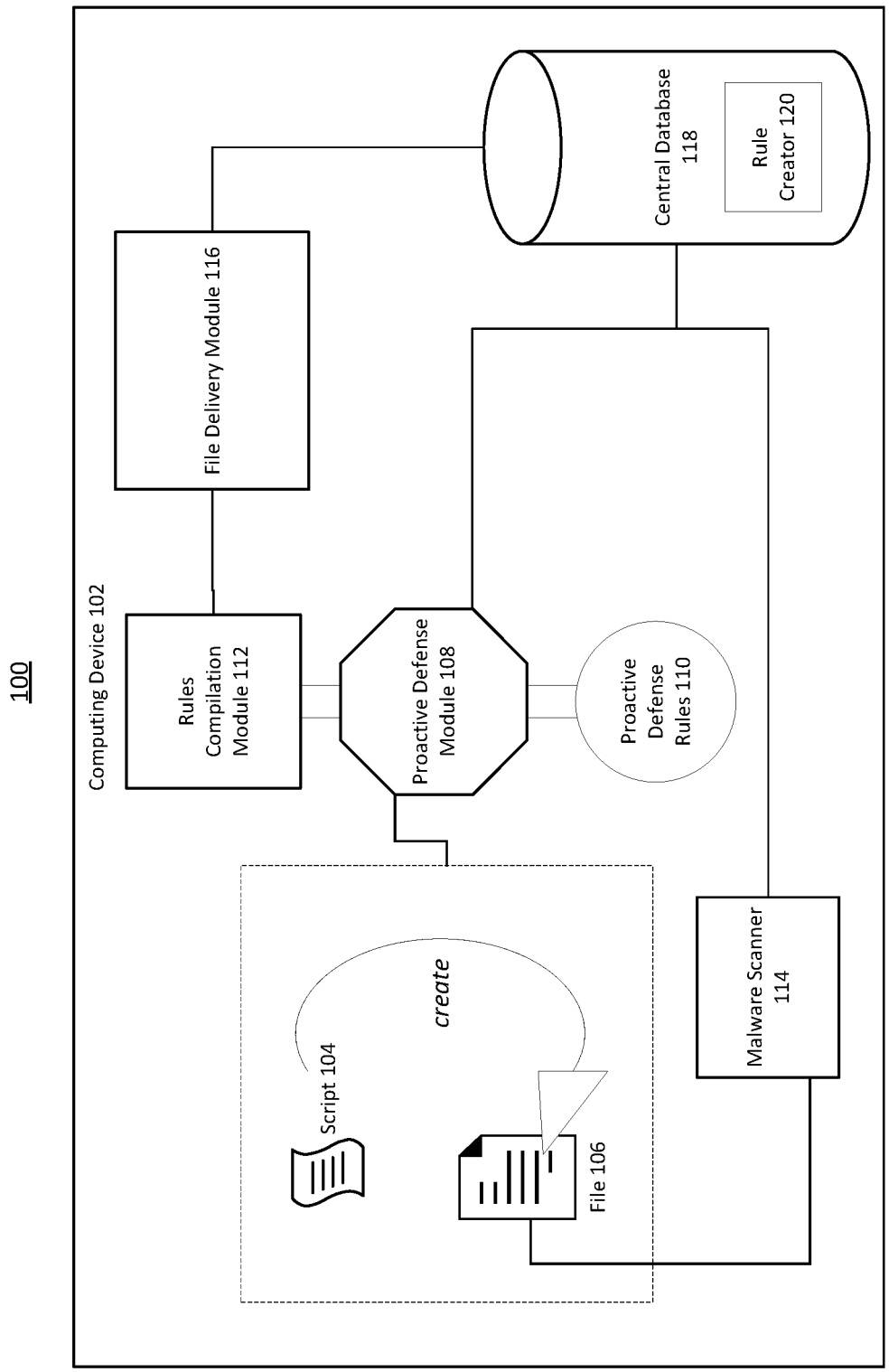
FIG. 1 is a block diagram illustrating a system for blocking malicious script execution.

FIG. 1 is a block diagram illustrating system 100 for blocking malicious script execution. Computing device 102 may be a computer, a laptop, a server, or any other device that can be targeted by malware. Stored in the memory of computing device 102 may be a script 104 that creates a malicious file 106. In some aspects, this creation may involve modifying an existing file to become file 106. It should be noted that because file 106 is malicious, script 104 is also malicious. However, a conventional security system may be unable to detect the maliciousness of script 104 and thus allow for its execution.

Computing device 102 includes proactive defense module 108, which is a binary program that stops the execution of scripts that harm computing device 102 (e.g., script 104). In some aspects, proactive defense module 108 is embedded in PHP. Proactive defense module 108 tracks active file operations (e.g., write, create) made by a script on computing device 102 and compares them against proactive defense rules 110, which is a database of signatures associated with malicious activity. All rules are made such that if a signature is detected, the execution of the associated script should be blocked. Suppose that a file operation of script 104 matches an operation in proactive defense rules 110 that should be blocked. In response to detecting the match, proactive defense module 108 blocks the operation. For example, proactive defense module 108 may prevent the creation of malicious file 106.

Determining whether to block complete execution of a script depends on whether the sequence of file operations is recognized by proactive defense module 108. In some cases, a script 104 may be novel malware that proactive defense module 108 cannot block because the blocking rule does not exist in rules 110. In order to learn new operation sequences to block, proactive defense module 108 works in conjunction with malware scanner 114. Malware scanner 114 may be a utility that analyzes files for the presence of malicious code. The analysis is made by periodically scanning files such as script 104 and file 106 on computing device 102.

Proactive defense module 108 collects information about active operations associated with script 104 and transmits the information to central database 118. Similarly, in response to detecting the presence of malicious activity, malware scanner 114 transmits information about the malicious activity to central database 118. Central database 118 is a server and software complex that stores and organizes the received data.

Rules creator 120 is a module that aligns the information sent by both malware scanner 114 and proactive defense module 108. For example, based on timestamps and the name of the malicious file, rule creator 120 may determine that the malicious file 106 is associated with the active operations of script 104. Rules creator 120 may generate a rule in text form that indicates that the active operations of script 104 should be blocked. Central database 118 transmits the rule back to file delivery module 116 for delivery to computing device 102. File delivery system 116 is a program that delivers files and information between computing device 102 and central database 118. Rules compilation module 112 is configured to convert the received rule from plain text format to the binary format understandable by proactive defense module 108. The converted rule is stored alongside rules 110 in the memory of computing device 102. Rules 110 is thus periodically updated with new signatures that indicate operations associated with malicious activity.

In some aspects, malware scanner 114, proactive defense module 108, and rules compilation module 112 are thin client applications and their thick client application counterparts may be stored on a remote server. For example, the thin client applications of malware scanner 114 and proactive defense module 108 may generate a copy of script 104 and transmit it to the remote server. The thick client applications on remote server may generate reports about malicious code detection and execution flows and transmit the reports to central database 118, which may also be stored on a remote server. In some aspects, malware scanner 114 is a third-party antivirus application that does not communicate with proactive defense module 108.

Figure 2:
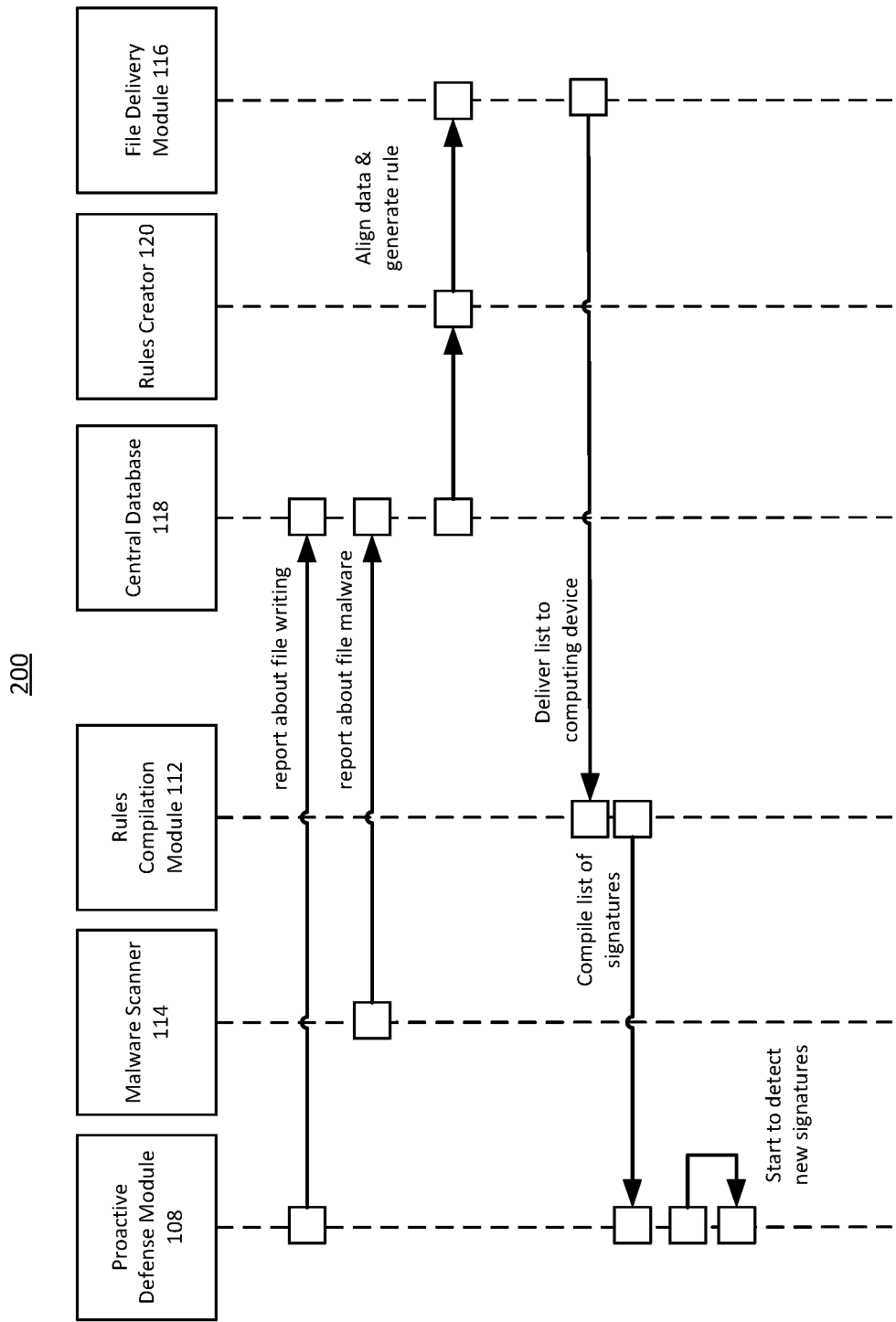
FIG. 2 is a flow diagram illustrating a method for updating defense rules.

FIG. 2 is a flow diagram illustrating method 200 for updating defense rules. Suppose that proactive defense module 108 is monitoring script 104. Proactive defense module 108 may write a queue of operations part of the execution flow in the form of a string array. For example, the array may be:

| f | a10, 20 | b | s | s | a100, 1 | f | e | s | a1, 1 |
|---|---------|---|---|---|---------|---|---|---|-------|

The letters above represent different operations. For example, in a PHP execution flow, a YAML file of proactive defense module 108 may include the following mappings between different characters and PHP functions:

e: exec
. . .
e: popen
u: include
. . .
u: curl_exec
u: curl_multi_exec
f: file_get_contents
f: file_put_contents
f: fopen
f: fwrite
f: symlink
f: move_uploaded_file
s: preg_replace
s: trim
s: str_replace
s: rawurldecode
h: register_shutdown_function
i: register_tick_function
y: set_exception_handler
v: openssl_decrypt
w: strrev
x: gzuncompress For example, "f" represents a group of PHP functions that work with files: fopen, fwrite, file_put_content, etc. "s" represents PHP functions working with strings: str_replace, trim, preg_replace, etc. "a" represents any other operation followed by the number of types of these operations and number of these operations.

When proactive defense module 108 records the operations or when file 106 is created by script 104, proactive defense module 108 sends a report to central database 118 that includes the string array and information about script 104. For example, the information may include an identifier (e.g., name, extension, size, etc.) of file 106 that is being created or modified, an identifier of script 104 that is being executed and that creates or modifies file 106, and a time of occurrence of each operation in the string array.

Malware scanner 114 has an extensive list of malware signatures and the ability to replenish the list quickly. At the moment of detecting such a file with malicious code (e.g., file 106), scanner 114 also sends a report to central database 118 including an identifier of file 106 and the time when it was modified/created.

Central database 118 may be organized by identifiers and timestamps. Rules creator 120 may retrieve the information in central database 118 and align the data acquired from malware scanner 114 and proactive defense module 108. For example, rules creator 120 may select a period of time (e.g., Monday between 3:00 pm and 3:15 pm) and retrieve all activity that was reported as occurring during the period of time. Rules creator 120 may then determine whether an identifier reported by malware scanner 114 matches an identifier reported by proactive defense module 108. For example, if script 104 was executed in the time period mentioned above, rules creator 120 may retrieve a first report from malware scanner 114 that mentions the name of file 106 (due to the detection of malicious code) and a second report from proactive defense module 108 that mentions the name of file 106 as well (due to the creation of file 106 by an operation of script 104). In response to determining that the identifiers match, rules creator 120 may generate a regular expression rule (e.g., in a text file). Referring to the queue of operations shown above, rules creator 120 may indicate in the rule that the following queue of operations is associated with malicious activity:

| f | a\d+, \d+ | b | s | s | a\d+, \d+ | f | e | s | a\d+, \d+ |
|---|---|---|---|---|---|---|---|---|---|

This rule comprises regular expressions that are each made up of a sequence of characters that define a search pattern. Thus, instead of "a10, 20," the regular expression "a\d+, d\+" enables a broader search. If an operation comprises any numbers (even if they are not 10 and 20 of the original operation), it will still fit into the regular expression. For example, "a\d+,\d+" also includes "a34, 2." At any given time, rules creator 120 may detect multiple matches of malicious files and script executions. Accordingly, rules creator 120 may generate a plurality of rules for a given period of time. Rules creator 120 may then generate a file that lists all of the generated rules. The file may further indicate an identifier of each script that created a malicious file, including script 104 responsible for creating malicious file 106. In some aspects, the rules are specific to a computing device (e.g., device 102). For example, the rules may not be applied to other computing devices (e.g., servers) to reduce the likelihood of false positives.

The file comprising the list of new rules is delivered to rules compilation module 112, which compiles a list of signatures by converting the rules from text format to binary format (e.g., compiled into binary file(s)). Each signature is stored in a separate file. Rules compilation module 112 may name each file based on a SHA256 hash of the path of the script. For example, rules compilation module may determine a hash of the path of script 104 by executing:
SHA256_CTX ctx;
SHA256_Init(&ctx);
SHA256_Update(&ctx, script, strlen(script)+1);
SHA256_Final(hash, &ctx);

In some aspects, proactive defense module 108, when executed by a script interpreter, determines the name of the currently executing script and loads only a set of signatures specific only to this script (based on the grouping in rules 110). This saves computational resources such as the memory of computing device 102.

Figure 3:
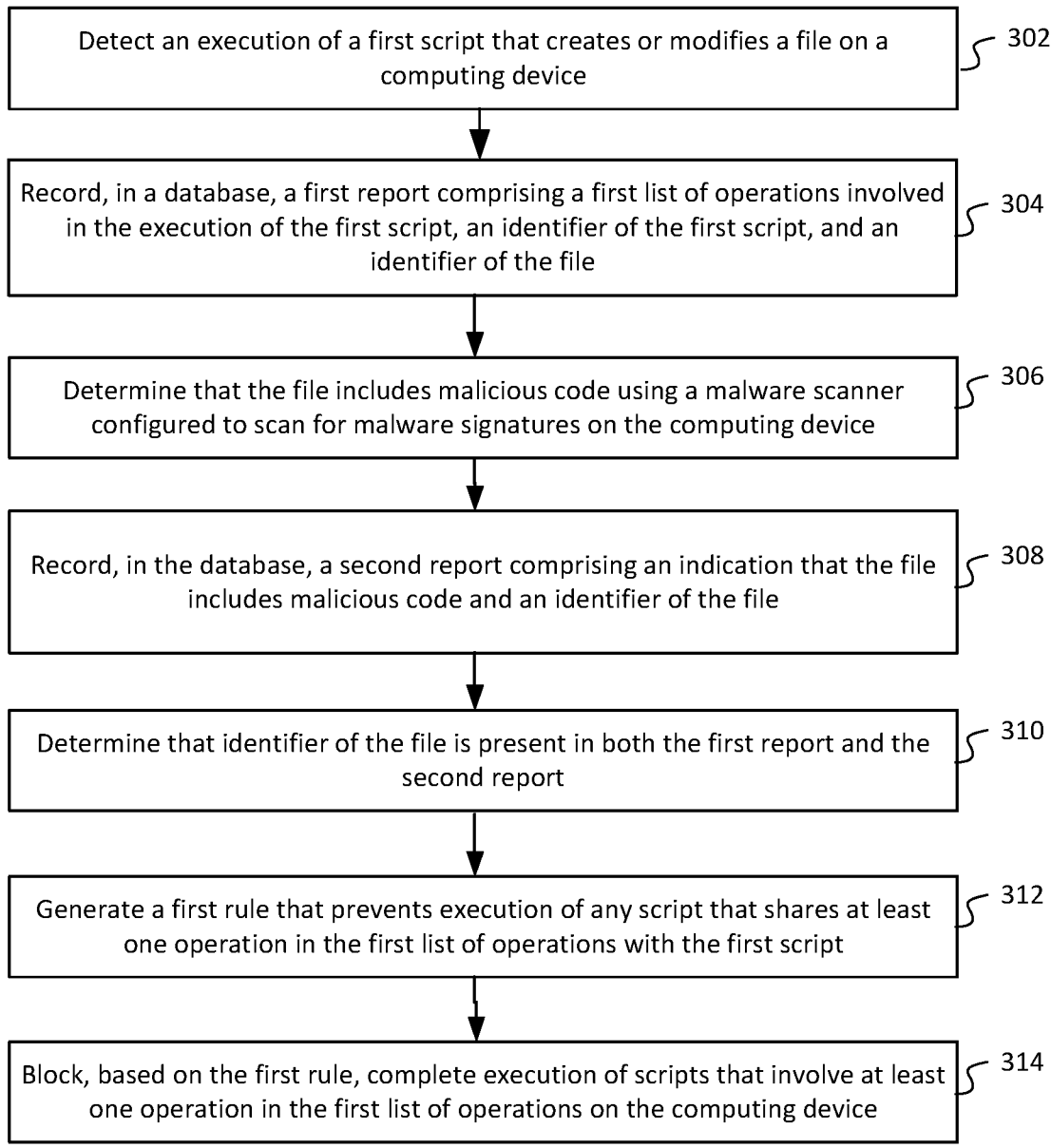
FIG. 3 illustrates a flow diagram of a method for blocking malicious script execution.

FIG. 3 illustrates a flow diagram of method 300 for blocking malicious script execution. At 302, proactive defense module 108 detects an execution of script 104 that creates or modifies file 106 on computing device 102. In some aspects, script 104 is a PHP script. It should be noted that script 104 may create or modify a plurality of files including file 106. Prior to the execution of script 104, proactive defense module 108 may determine whether to enable its execution. For example, proactive defense module 108 may determine whether a rule exists in the rules database (e.g., rules 110) indicating that the first script should be blocked, and enabling execution of the first script in response to determining that the rule does not exist in the rules database.

At 304, proactive defense module 108 records, in a database (e.g., central database 118), a first report comprising a first list of operations involved in the execution of the first script, an identifier of the script 104, and an identifier of file 106 (or any other file created/modified). At 306, malware scanner 114 determines that file 106 (and/or any other file created/modified) includes malicious code, wherein malware scanner 114 is configured to scan (in some aspects, periodically) for malware signatures on computing device 102. At 308, malware scanner 114 record, in central database 118, a second report comprising an indication that file 106 includes malicious code and an identifier of file 106.

At 310, rule creator 120 determines that identifier of file 106 (and/or any other file created/modified) is present in both the first report and the second report. In some aspects, each report includes timestamps that rule creator 120 aligns. For example, the first report includes timestamps of operations (e.g., 3:00 pm, 3:05 pm, 3:06 pm, 3:09 pm) and the second report includes a timestamp of when file 106 was created or modified (e.g., 3:06 pm). Rule creator 120 may determine a time period spanning the timestamps (e.g., 3:00 pm to 3:09 pm) of the list of operations and then determine that the first report should be compared to the second report in response to determining that the timestamp of when file 106 was created or modified occurs within the time period.

At 312, rule creator 120 generates a first rule that prevents execution of any script that shares at least one operation in the first list of operations with the first script. In some aspects, the first rule also accounts for modified versions of the list of operations to block. At 314, proactive defense module 108 blocks, based on the first rule, complete execution of scripts that involve at least one operation in the first list of operations on computing device 102. This is further described in FIG. 4.

Figure 4:
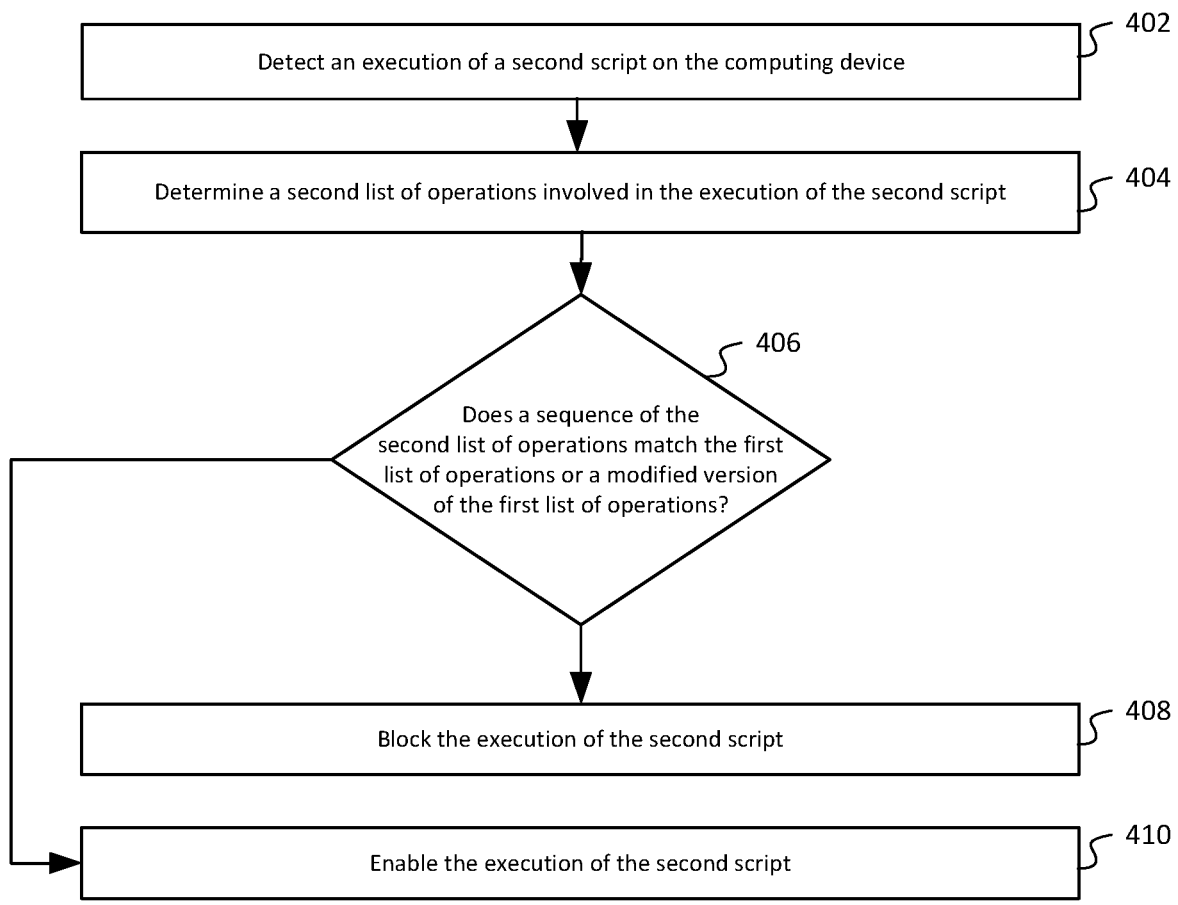
FIG. 4 illustrates a flow diagram of a method for comparing operations of a suspected script to existing rules.

FIG. 4 illustrates a flow diagram of method 400 for comparing operations of a suspected script to existing rules. At 402, proactive defense module 108 detects an execution of a second script on computing device 102. The script may be titled "uploader.php" and may be in a directory addressed "/home/rrr/." The contents of the script may be
<?php
echo "Start script\n";
sleep(1);
$a="WDVPIVAIQEFQaaaWzRcUFpYNTQoUF4pNON-DKTd9JEaaaVJQOFSLVNUQU5EQV JELUFOVEaaa IWSVJVUy1URVNULUZJTEUhJEgrSCo=";
$b=str_replace("aaa", " ", $a);
$i=0;
while($i<3){
sleep(1);

```
$i++;
echo "$i\n";
}
$c=base64_decode($b);
$res=file_put_contents("/home/rrr/test1.virus", $c);
var_dump($res);
```

As can be seen by the command "file_put_contents," the script creates a malicious file "test1.virus" in the directory "rrr." At 404, proactive defense module 108 determines a second list of operations involved in the execution of the second script. In the context of the present disclosure, a complete execution of a script occurs when a file is created or when modifications to an existing file are written. More specifically, proactive defense module 108 blocks operations referred to by the letter "f." Such operations will write, put contents in, move files, etc. While other operations may replace strings, for example, the changes are not finalized until the file is written. Suppose that the second list of operations associated with a complete execution of the script "uploader.php" is

| f | o | a3,1 | s | a2,2 | f |
|---|---|------|---|------|---|

Proactive defense module 108 may execute one operation at a time until the final "f." Before completing execution of the script by executing "f," proactive defense module 108 may compare the second list of operations with signatures in rules 110.

At 406, proactive defense module 108 determines whether a sequence of the second list of operations matches the first list of operations or a modified version of the first list of operations in the rules database. For example, if there are 6 operations, proactive defense module 108 may determine whether at 5 of the operations match and are in the same order. In some aspects, the threshold number of operations that need to match is adjustable (e.g., by a user) to improve the accuracy of the system and prevent false positives. For example, a rule in rules 110 with the first list of operations may be:
  rule:
  id: 80000
  description: Auto Immunity rule
  detection:

| f | 0 | a\d+,\d+\| | s | a\d+,\d+\| | f |
|---|---|------------|---|------------|---| script: /home/rrr/uploader.php

If the sequences match, method 400 advances to 408, where proactive defense module 108 blocks the execution of the second script. If the sequences do not match, method 400 advances to 410, where proactive defense module 108 enables the execution of the second script.

As there may be several thousand rules in rules 110, proactive defense module 108 may minimize the search based on the hash of the scripts address. As discussed before, proactive defense module 108 may determine the hash of, for example, "/home/rrr/uploader.php" and search for that hash value in rules 110. In response to finding the hash value in rules 110, proactive defense module 108 may execute method 400.

In some aspects, if a signature in rules 110 is not detected over a certain period of time (e.g., 1 year), the signature is removed from rules 110 by proactive defense module 108. This removal is performed to save storage and reduce processing (when comparing a detected execution flow against the signatures in rules 110 as there are fewer signatures to compare with).

In some rare instances, a user may generate a file that shares the name with a malicious script and has a similar execution flow. Proactive defense module 108 may block the complete execution of the file despite the file being safe. In such cases, a user may place the file in a white list of proactive defense module to avoid false positives and enable execution of the file.

Figure 5:
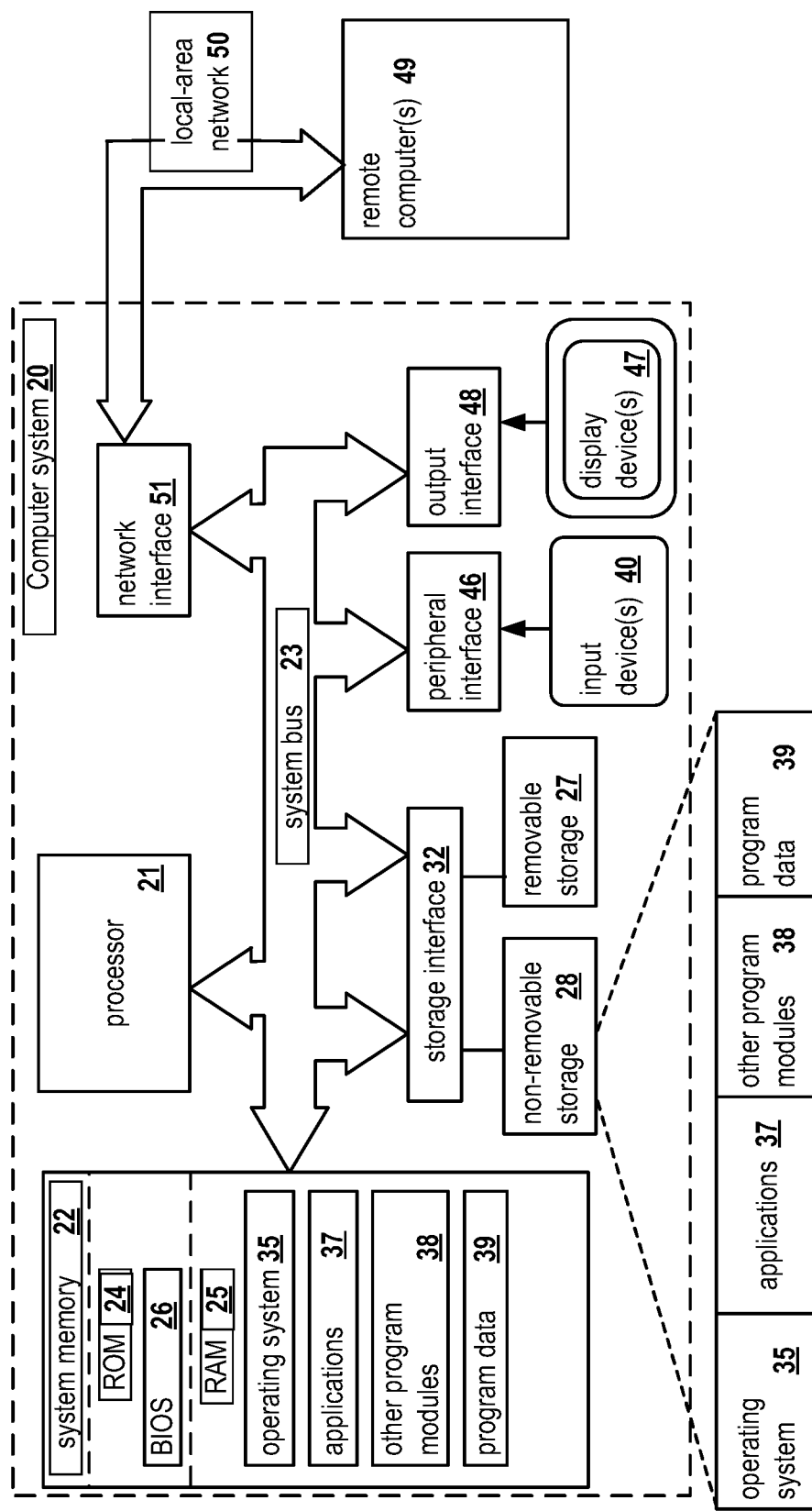
FIG. 5 presents an example of a general-purpose computer system on which aspects of the present disclosure can be implemented.

FIG. 5 is a block diagram illustrating a computer system 20 on which aspects of systems and methods for blocking malicious script execution may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for blocking malicious script execution, the method comprising:
   detecting an execution of a first script that creates or modifies a file on a computing device;
   recording, in a database, a first report comprising a first list of operations involved in the execution of the first script, an identifier of the first script, and an identifier of the file;
   determining that the file includes malicious code using a malware scanner configured to scan for malware signatures on the computing device;
   recording, in the database, a second report comprising an indication that the file includes malicious code and an identifier of the file;
   in response to determining that identifier of the file is present in both the first report and the second report, generating a first rule that prevents execution of any script that shares at least one operation in the first list of operations with the first script; and
   blocking, based on the first rule, complete execution of scripts that involve at least one operation in the first list of operations on the computing device.

2. The method of claim 1, wherein blocking the complete execution of scripts comprises:
   detecting an execution of a second script on the computing device;
   determining a second list of operations involved in the execution of the second script;
   applying the first rule on the second list of operations by:
      comparing the first list of operations with the second list of operations;
      determining, based on the comparing, that the first list of operations corresponds to the second list of operations; and
      blocking the execution of the second script from completion.

3. The method of claim 1, further comprising:
   prior to the execution of the first script, determining whether a rule exists in a rules database indicating that the first script should be blocked; and
   enabling execution of the first script in response to determining that the rule does not exist in the rules database.

4. The method of claim 1, wherein the first report includes timestamps of operations and the second report includes a timestamp of when the file was created or modified, further comprising:

determining a time period associated with the timestamps of the list of operations; and
determining that the first report should be compared to the second report in response to determining that the timestamp of when the file was created or modified occurs within the time period.

5. The method of claim 1, wherein the first rule further comprises a modified version of the first list of operations to block.

6. The method of claim 5, further comprising:
   determining the modified version of the list of operations by converting each operation identifier in the list of operations to a regular expression.

7. The method of claim 1, further comprising:
   converting the first rule from a text format to a binary format; and
   storing the converted first rule in a rules database.

8. The method of claim 1, wherein the execution of the first script creates or modifies a plurality of files including the file and another file, wherein the another file is identified as including malicious code by the malware scanner, and wherein generating the first rule is further in response to detecting either an identifier of the another file or the identifier of the file in both the first report and the second report.

9. The method of claim 1, wherein the first script is a PHP script.

10. A system for blocking malicious script execution, the system comprising:
    a hardware processor configured to:
       detect an execution of a first script that creates or modifies a file on a computing device;
       record, in a database, a first report comprising a first list of operations involved in the execution of the first script, an identifier of the first script, and an identifier of the file;
       determine that the file includes malicious code using a malware scanner configured to scan for malware signatures on the computing device;
       record, in the database, a second report comprising an indication that the file includes malicious code and an identifier of the file;
       in response to determining that identifier of the file is present in both the first report and the second report, generate a first rule that prevents execution of any script that shares at least one operation in the first list of operations with the first script; and
       block, based on the first rule, complete execution of scripts that involve at least one operation in the first list of operations on the computing device.

11. The system of claim 10, wherein the hardware processor is further configured to block the complete execution of scripts by:
    detecting an execution of a second script on the computing device;
    determining a second list of operations involved in the execution of the second script;
    applying the first rule on the second list of operations by:
       comparing the first list of operations with the second list of operations;
       determining, based on the comparing, that the first list of operations corresponds to the second list of operations; and
       blocking the execution of the second script from completion.

12. The system of claim 10, wherein the hardware processor is further configured to:
    prior to the execution of the first script, determine whether a rule exists in a rules database indicating that the first script should be blocked; and
    enable execution of the first script in response to determining that the rule does not exist in the rules database.

13. The system of claim 10, wherein the first report includes timestamps of operations and the second report includes a timestamp of when the file was created or modified, wherein the hardware processor is further configured to:
    determine a time period associated with the timestamps of the list of operations; and
    determine that the first report should be compared to the second report in response to determining that the timestamp of when the file was created or modified occurs within the time period.

14. The system of claim 10, wherein the first rule further comprises a modified version of the list of operations to block.

15. The system of claim 14, wherein the hardware processor is further configured to:
    determine the modified version of the list of operations by converting each operation identifier in the list of operations to a regular expression.

16. The system of claim 10, wherein the hardware processor is further configured to:
    convert the first rule from a text format to a binary format; and
    store the converted first rule in a rules database.

17. The system of claim 10, wherein the execution of the first script creates or modifies a plurality of files including the file and another file, wherein the another file is identified as including malicious code by the malware scanner, and wherein the hardware processor is further configured to generate the first rule further in response to detecting either an identifier of the another file or the identifier of the file in both the first report and the second report.

18. The system of claim 10, wherein the first script is a PHP script.

19. A non-transitory computer readable medium storing thereon computer executable instructions for blocking malicious script execution, including instructions for:
    detecting an execution of a first script that creates or modifies a file on a computing device;
    recording, in a database, a first report comprising a first list of operations involved in the execution of the first script, an identifier of the first script, and an identifier of the file;
    determining that the file includes malicious code using a malware scanner configured to scan for malware signatures on the computing device;
    recording, in the database, a second report comprising an indication that the file includes malicious code and an identifier of the file;
    in response to determining that identifier of the file is present in both the first report and the second report, generating a first rule that prevents execution of any script that shares at least one operation in the first list of operations with the first script; and
    blocking, based on the first rule, complete execution of scripts that involve at least one operation in the first list of operations on the computing device.

20. The non-transitory computer readable medium of claim 19, wherein instructions for blocking the complete execution of scripts comprise instructions for:
    detecting an execution of a second script on the computing device;
    determining a second list of operations involved in the execution of the second script;
    applying the first rule on the second list of operations by:
        comparing the first list of operations with the second list of operations;
        determining, based on the comparing, that the first list of operations corresponds to the second list of operations; and
        blocking the execution of the second script from completion.

\* \* \* \* \*